Patented Jan. 20, 1953

2,626,253

UNITED STATES PATENT OFFICE 2,626,253

ARALKYLATED DIHYDROQUINOLINES

Joseph R. Ingram, Nitro, W. Va., assignor to Monsanto Chemical Company, St. Louis, Mo., a corporation of Delaware No Drawing. Original application November 24, 1948, Serial No. 61,911. Divided and this application July 2, 1949, Serial No. 102,960

4 Claims. (Cl. 260—88.3)

This invention relates to new and useful compositions of matter and methods of making same. More particularly the invention relates to aralkylated 1,2-dihydroquinolines.

It has been found in accordance with the present invention that aralkylated 1,2-dihydroquinoline bodies are a new family of chemical compounds and are representative of a highly effective and economical class of rubber antioxidants. The new chemicals are obtained by reacting a 1,2-dihydroquinoline with a suitable aralkylating agent and are to be distinguished from alkyl, aryl, and other substituted dihydroquinolines known to possess antioxidant properties. Thus substituted dihydroquinoline antioxidants have been obtained by reacting a substituted aniline with a ketone but these products do not possess the properties of the new class. The new chemicals are not only adaptable to rubber vulcanizates containing carbon black for improving flexing properties but are suitable for white rubber stocks also. In contrast to most rubber antioxidants containing nitrogen, they are resistant to staining and discoloration.

Aralkyl substituted 1,2-dihydroquinolines may be prepared conveniently by a number of methods, for example, by condensing an aralkyl halide with a 1,2-dihydroquinoline in the presence of a catalyst such as aluminum chloride or zinc chloride. Suitable halides are benzyl chloride, diphenyl methyl chloride, triphenyl methyl chloride, phenethyl chloride, chlor propyl benzene, indanyl chloride, and the like. Another method of preparation is to react an aromatic substituted olefinic hydrocarbon with a 1,2-dihydroquinoline in the presence of a non-oxidizing catalyst. Among the aromatic substituted olefinic hydrocarbons which will readily react are styrene, o-, m-, and p-methyl styrene, o-, m-, and p-ethyl styrene, the diethyl styrenes, allyl benzene, the divinyl benzenes, the phenyl butadienes, α and β vinyl naphthalene, vinyl pyridine, indene, α methyl indene, and their hydroxy and alkoxy substituted analogues. Mixtures of the above materials are also contemplated.

The chemical structure of the products obtained by reacting a 1,2-dihydroquinoline with an aralkyl halide or an aromatic substituted olefinic hydrocarbon is not known but the reaction is believed to involve, principally, the carbon atom containing the halogen substituent of the aralkyl halide or the unsaturated carbon atom nearest the aromatic nucleus of the aromatic substituted olefinic hydrocarbon and a carbon atom in the nucleus of the dihydroquinoline. However, the present invention is not limited to any assumption as to chemical structure but pertains broadly to the products obtained by reacting an aralkyl halide or an aromatic substituted olefinic hydrocarbon with a 1,2-dihydroquinoline.

As examplary of the preparation of the new chemicals the following examples are illustrative and are not to be construed as limitative thereof.

EXAMPLE 1

To a 3-neck flask equipped with a thermometer, a stirrer, and a reflux condenser, containing 34.6 parts by weight (substantially 0.2 mol) of 2,2,4-trimethyl 1,2-dihydroquinoline was added 27.6 parts by weight (substantially 0.2 mol) of 85% indene and 75 ml. of benzene. While agitating, 26.6 parts by weight (substantially 0.2 mol) of anhydrous aluminum chloride was added. The mixture was then heated at the reflux temperature for 4 hours. The mix was cooled and placed in a distilling apparatus containing 130 parts by weight of a 25% sodium hydroxide solution and the benzene distilled off. Thereupon the mix was steam distilled to remove the last traces of benzene and unreacted indene. The residue was washed free of alkali and dried at 60° C. The dried product believed to be an indanyl substituted 2,2,4-trimethyl 1,2-dihydroquinoline was found to have a melting point of approximately 95° C. The yield was about 100%.

EXAMPLE 2

To a 3-neck flask equipped with a thermometer, a stirrer, and a reflux condenser containing 17.3 parts by weight (substantially 0.1 mol) of 2,2,4-trimethyl 1,2-dihydroquinoline was added 10.4 parts by weight (substantially 0.1 mol) of styrene. While agitating, 13.3 parts by weight (substantially 0.1 mol) of aluminum chloride was added. The reaction vessel was then placed in a steam bath and heated for 2½ hours. A solid resinous material developed which was washed with water and caustic, and taken up with toluene. Upon removal of the solvent 26.5 parts (96% yield) by weight of a resinous product was recovered.

EXAMPLE 3

To a suitable reaction vessel containing 26 parts by weight (substantially 0.15 mols) of 2,2,4-trimethyl 1,2-dihydroquinoline and 22.2 parts by weight (substantially 0.15 mol) of anethole (p-methoxy allyl benzene) was added 20 parts by weight (substantially 0.15 mol) of aluminum chloride. The contents of the reaction vessel were heated for 3 hours at 60° to 80° C. Upon cooling the reaction product was washed with water and caustic and taken up with benzene. Upon removal of the solvent 39 grams (80% yield) of a resinous like product having a melting point of about 80° C. was obtained.

EXAMPLE 4

A mixture of 38 parts by weight (substantially 0.3 mold) of benzyl chloride, 52 parts by weight (substantially 0.3 mol) of 2,2,4-trimethyl 1,2-dihydroquinoline, and 50 parts by weight (substantially 0.36 mol) of anhydrous zinc chloride was heated over a steam bath for 7 hours. The zinc chloride catalyst was removed from the reaction product by several washings with hot water. Thereupon the resinous product was taken up with benzene and washed free of residual acid. Upon removal of the solvent approximately 68 parts by weight (about 100% yield) of a resinous product was obtained.

EXAMPLE 5

A suitable reaction vessel containing a reaction mix consisting of 47 parts by weight (substantially 0.3 mol) of indanyl chloride and 51.9 parts by weight (substantially 0.3 mol) of 2,2,4-trimethyl 1,2-dihydroquinoline dissolved in carbon disulfide was heated for 2½ hours at approximately 40°–46° C. in the presence of 40 parts by weight (substantially 0.3 mol) of anhydrous aluminum chloride. The carbon disulfide was removed and the reaction product was washed with water and caustic, and taken up with benzene. Upon removal of the solvent 80 parts by weight of a resinous product was isolated. This product was not unlike the residual product of Example 1.

EXAMPLE 6

A mixture of 54.6 parts by weight (substantially 0.7 mol) of benzene and 30.8 parts by weight (substantially 0.2 mol) of carbon tetrachloride was placed in a 3-neck flask equipped with an agitator, a thermometer, and a reflux condenser and thereto was added slowly 26.7 parts by weight (substantially 0.2 mol) of anhydrous aluminum chloride. 34.6 parts by weight (substantially 0.2 mol) of 2,2,4-trimethyl 1,2-dihydroquinoline dissolved in 30 parts by weight (substantially 0.38 mol) of benzene was admitted to the reaction vessel and the contents heated for 2 hours at the reflux temperature. Upon cooling the reaction product was washed with water and caustic and the residual benzene distilled off leaving 74 parts by weight (95% yield) of a reddish yellow resinous product believed to be principally triphenyl methyl substituted 2,2,4-trimethyl 1,2-dihydroquinoline. The resinous product was distilled under diminished pressure and the residue found to have a melting point of about 93° C.

While in the above examples only one dihydroquinoline reactant has been described, other 1,2-dihydroquinolines, mixtures of dihydroquinolines, and the crude reaction product of 1 mol of an aromatic amine and 2 mols of an aliphatic ketone, can be aralkylated in a like manner to produce similar products having useful oxidative inhibiting and non-discoloring properties. For example, 2 - methyl-2,4-diethyl-1,2-dihydroquinoline, 2-methyl-2,4-diisopropyl-1,2-dihydroquinoline, and the crude reaction product of 1 mol of aniline and 2 mols of acetone are contemplated.

As specific embodiments of the invention portraying the age-resistant properties of aralkyl substituted 1,2-dihydroquinolines, rubber stocks were compounded comprising

|  | Parts by weight | | | |
| --- | --- | --- | --- | --- |
|  | A | B | C | D |
| Smoked sheets rubber | 100 | 100 | 100 | 100 |
| Carbon black | 50 | 50 | 50 | 50 |
| Zinc oxide | 5 | 5 | 5 | 5 |
| Pine tar | 2 | 2 | 2 | 2 |
| Stearic acid | 3 | 3 | 3 | 3 |
| Sulfur | 3 | 3 | 3 | 3 |
| Mercaptobenzothiazole | .75 | .75 | .75 | .75 |
| Indanyl chloride-2,2,4-trimethyl 1,2-dihydroquinoline reaction product | 1.0 | | | |
| Styrene-2,2,4-trimethyl 1,2-dihydroquinoline reaction product | | 1.0 | | |
| Anethole-2,2,4-trimethyl 1,2-dihydroquinoline reaction product | | | 1.0 | |

The rubber stocks so compounded were vulcanized in a press for 60 and 90 minutes respectively at 135° C. Test strips were cut from the vulcanized stocks and artificially aged for 6 and 9 hours respectively at 121° C. in an air bomb under 80 pounds per square inch pressure. The results are as follows:

*Table I*

|  | Modulus in p. s. i. | | Ult. elong., percent | Ultimate tensile in p. s. i. | Tensile in p. s. i. after aging in air bomb at 121° C. | |
| --- | --- | --- | --- | --- | --- | --- |
|  | 300% | 500% |  |  | 6 hrs. | 9 hrs. |
| 60 min. cure at 135° C.: | | | | | | |
| Stock A | 1,820 | 3,803 | 590 | 4,650 | 3,047 | 1,670 |
| Stock B | 1,793 | 3,813 | 593 | 4,620 | 3,167 | 1,853 |
| Stock C | 1,863 | 3,827 | 590 | 4,673 | 3,097 | 1,970 |
| Stock D | 1,827 | 3,973 | 517 | 4,150 | 1,710 | 783 |
| 90 min. cure at 135° C.: | | | | | | |
| Stock A | 1,923 | 4,070 | 533 | 4,360 | 2,977 | 1,427 |
| Stock B | 2,120 | 4,047 | 573 | 4,550 | 3,025 | 1,203 |
| Stock C | 2,093 | 4,177 | 527 | 4,460 | 3,157 | 1,430 |
| Stock D | 2,050 | 4,227 | 510 | 4,313 | 1,695 | 955 |

The foregoing data clearly show that the various stocks treated with aralkylated 1,2-dihydroquinolines possess excellent age-resistant properties as compared to the control stock (Stock D). Compounded Stocks A, B, and C exhibited excellent anti-flex cracking properties, as for example the following results were obtained employing a flexing machine as set forth by L. V. Cooper, Analytical Edition of Industrial and Engineering Chemistry, vol. 2, No. 4, pp. 391–394.

*Table II*

| Stock | Kilocycles to failure | | | |
| --- | --- | --- | --- | --- |
|  | A | B | C | D |
| Unaged | 168 | 203 | 167 | 138 |
| Aged 9 hours at 121° C. in air bomb | 184 | 128 | 161 | 25 |
| Aged 120 hours at 70° C. in oxygen bomb | 55 | 78 | 91 | 1 |

As exemplary of the non-discoloring properties of the new antioxidants, the following stock was compounded:

| | |
|---|---|
| Pale crepe rubber | 100 |
| Zinc oxide | 60 |
| Lithopone | 20 |
| Sulfur | 2 |
| Benzothiazyl thio benzoate | .675 |
| Diphenylguanidine-phthalic acid reaction product | .825 |
| Paraffin | .25 |
| Styrene - 2,2,4 - trimethyl - 1,2 - dihydroquinoline reaction product | 1.0 | and vulcanized in a press for 45 and 60 minutes respectively at 126° C. After 9 hour air bomb aging at 121° C. and 80 pounds per square inch pressure, the tensile strengths for the 45 and 60 minute cures, respectively, were 2840 and 2820 pounds per square inch. Test strips cut from the 45 and 60 minute cured rubber stock showed only a slight yellowing effect after exposure to the rays of a sunlamp for ten days. Other aralkylated 1,2-dihydroquinolines such as the anethole-2,2,4 - trimethyl - 1,2 - dihydroquinoline reaction product, the triphenyl methyl chloride-2,2,4-trimethyl-1,2-dihydroquinoline reaction product and the benzyl chloride-2,2,4-trimethyl-1,2-dihydroquinoline reaction product similarly exhibited remarkable resistance to light deterioration upon exposure to sunlamp rays.

Obviously the examples set forth above show that rubber compositions containing an aralkylated 1,2-dihydroquinoline are markedly resistant to the deteriorating influences of flexing, heat, oxidation, and light, and while the above data describes only specific compounds of the new class of rubber antioxidants, all members of said class are advantageous in carrying out the objects of the invention.

For most purposes 1 percent of the new family of rubber antioxidants based upon the weight of the rubber affords good protection with an ample margin of safety but amounts as small as 0.2 percent are effective. Amounts above 1 percent, as for example 2.5 percent or more, may be employed where desired although usually without added benefit.

The new chemicals may be employed as antioxidants in other rubbers than natural rubber, such as rubber substitutes, synthetic rubber, and the like whether or not admixed with fillers, pigments, accelerators, etc.

The new antioxidants may be incorporated into a rubber or rubber like substance by milling or mastication, added to rubber latices, or any equivalent procedure such as applying them to the surface of a vulcanized or unvulcanized rubber in the form of a powder or paste.

While certain specific embodiments of this invention have been described in detail herein, it is to be understood that the invention is not limited for many modifications may be resorted to such as varying the proportions of the new antioxidants and incorporating in the stock other vulcanization accelerators than the above disclosed, without departing from the spirit or scope of the invention.

This invention is a division of co-pending application Serial No. 61,911 filed November 24, 1948.

What is claimed is:

1. The method of making a resinous aralkyated dihydroquinoline antioxidant which comprises heating in the presence of one mole of a Friedel-Crafts catalyst one mole of a 1,2-dihydroquinoline containing only carbon, hydrogen and one nitrogen atom and substantially one mole of a reagent selected from the group consisting of aralkyl chlorides, indanyl chloride and aromatic substituted olefins containing 8 to 12 carbon atoms and not more than two $CH_2=CH-$ groups as the sole olefinic constituents.

2. The method of making a resinous aralkylated dihydroquinoline antioxidant composition which comprises heating in the presence of one mole of a Friedel-Crafts catalyst one mole of 2,2,4-trimethyl-1,2-dihydroquinoline and substantially one mole of styrene.

3. The method of making a resinous aralkylated dihydroquinoline antioxidant composition which comprises heating in the presence of one mole of a Friedel-Crafts catalyst one mole of 2,2,4-trimethyl-1,2-dihydroquinoline and substantially one mole of indene.

4. The method of making a resinous aralkylated dihydroquinoline antioxidant composition which comprises heating in the presence of one mole of a Friedel-Crafts catalyst one mole of 2,2,4-trimethyl-1,2-dihydroquinoline and substantially one mole of benzyl chloride.

JOSEPH R. INGRAM.

REFERENCES CITED

The following references are of record in the file of this patent:

UNITED STATES PATENTS

| Number | Name | Date |
|---|---|---|
| 2,160,200 | Dunbrook et al. | May 30, 1939 |
| 2,203,899 | Dunbrook et al. | June 11, 1940 |
| 2,268,419 | Paul | Dec. 30, 1941 |
| 2,400,500 | Gibbs | May 21, 1946 |
| 2,530,774 | Kehe | Nov. 21, 1950 |